Patented May 22, 1934

1,959,576

UNITED STATES PATENT OFFICE 1,959,576

PROCESS OF RECLAIMING RUBBER

Taliaferro J. Fairley, Alexandria, and Robert Frye, Shreveport, La., assignors, by direct and mesne assignments, of one-half to W. J. Hunter and one-half to Mary P. Hunter, both of Shreveport, La.

No Drawing. Application July 6, 1931,
Serial No. 549,121

6 Claims. (Cl. 18—52)

Our improvement relates to the treatment of rubber and is particularly concerned with a process comprising the treatment with a solvent such as described in Fairley's application, Serial No. 279,603, which has issued into United States Patent 1,843,388 February 2, 1932.

As described in the said application, the rubber whether it be virgin rubber or vulcanized, is subjected to treatment with a solvent which is a fractional distillate of turpentine, prepared by subjecting the turpentine to distillation in the presence of colloidal clay, as, for example, bentonite.

The solvent material recovered by this treatment as a distillate or distillates are mainly the fraction up to 150° C., and from 150° C. to 170° C.; also the fraction from 170 to 190, as well as the fraction 190 to 250.

Clearly, various of the fractions may be used individually or may be blended, dependent upon the character of rubber employed, and it may be stated that our treatment has proven satisfactory in connection with crude or virgin rubber, vulcanized rubber, so-called hard rubber such as vulcanite and, in fact, to various rubber products as now manufactured. The present invention is an improvement over the process described in said patent and comprises distilling off the solvent, treating with dilute $H_2SO_4$ and washing to remove any traces of remaining solvent, and drying the rubber to obtain a product substantially free from stickiness.

In carrying out the invention, we place the rubber to be treated or devulcanized in a suitable vessel or container, and cover it with an appropriate amount of the above mentioned solvent. In connection with the container, we may or may not use a reflux condenser and the process may proceed under ordinary atmospheric pressure or under vacuum. The advantage of a vacuum treatment may be briefly stated to be that the boiling point of the solvent is lowered, so that it will be possible to heat the batch to boiling with the desirable resultant agitation.

Where, however, the vacuum treatment is not employed, we subject the batch to a gentle heat and have determined that the most satisfactory temperature is one which is preferably below the boiling point of the solvent.

Just what this temperature will be, of course, will vary in accordance with the nature of the solvent, as well as the rubber under treatment, but it can be stated as somewhere below 175° C. and above 100° C. Of course, it is possible that in some cases a temperature below 100° would be satisfactory, but we have, in our experiments so far, not encountered any rubber which would go into solution in this solvent below this temperature. In this connection, it should be stated that the range of temperatures which we preferably employ, have been eminently satisfactory, because the rubber has gone into solution very rapidly and the time element is one of major importance in an operation of this character. The temperatures below 100° C. might, under these circumstances, be equally satisfactory, but the time required would be impractical from the standpoint of economic operation.

In heating the batch, a gentle heat is applied and thereafter the temperature is gradually raised and the rubber passes into solution rapidly, up to the desired temperature which we find it satisfactory to maintain. This temperature may, for instance, be 120° C. and in some cases 130° C. and in other cases as high as 150° C.

The range of temperatures is important, since the residue to be obtained may be sticky and tacky and wholly unsatisfactory, unless with a particular rubber an appropriate temperature is employed and this, as stated, we have found to be preferably one below the boiling point of the solvent.

When a test indicates that the rubber is dissolved, the next step is to remove therefrom the textile fibers, generally cotton fibers, and in order to reclaim these, the solution is preferably strained or filtered.

The textile fibers recovered have a marked degree of life and can be reused for many purposes. If they require bleaching, obviously this can be readily accomplished.

After the solution has been strained, the solvent is driven off by heating and collected. The sticky rubber mass is then treated or kneaded with a small amount of dilute sulphuric acid after which the acid is washed out and the rubber dried to obtain plastic, non-tacky material which on drying will resemble crude rubber. We find that by this process any solvent which remains after the distillation, is removed and the product will not be tacky nor full of bubbles on vulcanization.

We claim:

1. The process of treating vulcanized rubber which comprises mixing the rubber with a distillate obtained by distilling a turpene wood fraction obtained from the direct distillation of wood in the presence of a clay having a catalytic action, and heating the mass until the rubber goes into solution, driving off the solvent by heating, treating the rubber residue with dilute sulphuric acid, and separating the rubber from the acid to obtain a soft rubber mass substantially free from stickiness.

2. The process of treating vulcanized rubber which comprises mixing the rubber with a distillate obtained by fractionally distilling turpentine in the presence of a clay having a catalytic action, heating the mass until the rubber goes into solution, driving off the solvent by heating treating the rubber residue with dilute sulphuric acid, and separating the rubber from the acid to obtain a soft rubber mass substantially free from stickiness.

3. The process of treating vulcanized rubber which comprises mixing the rubber with a distillate comprising at least one of the fractions boiling below 250° C. obtained by fractionally distilling turpentine in the presence of a clay having a catalytic action, heating the mass until the rubber goes into solution, driving off the solvent by heating, treating the rubber residue with dilute sulphuric acid, and separating the rubber from the acid to obtain a soft rubber mass substantially free from stickiness.

4. The process of treating vulcanized rubber which comprises mixing the rubber with a distillate comprising the fractions boiling up to 190° C. obtained by fractionally distilling turpentine in the presence of a clay having a catalytic action, heating the mass to form a solution, driving off the solvent by heating, treating the rubber residue with dilute sulphuric acid, and separating the rubber from the acid to obtain a soft rubber mass substantially free from stickiness.

5. The process of treating vulcanized rubber which comprises mixing the rubber with a distillate comprising at least one of the fractions boiling below 250° C. obtained by fractionally distilling turpentine in the presence of a clay having a catalytic action, heating the mass until the rubber goes into solution, straining the solution, driving off the solvent by heating, treating the rubber residue with dilute sulphuric acid, and separating the rubber from the acid to obtain a soft rubber mass substantially free from stickiness.

6. The process of treating vulcanized rubber which comprises mixing the rubber with a distillate comprising at least one of the fractions boiling below 250° C. obtained by fractionally distilling turpentine in the presence of a clay having a catalytic action, heating the mass until the rubber goes into solution, driving off the solvent by heating, treating the rubber residue with dilute sulphuric acid, and separating the rubber from the acid to obtain a soft rubber mass substantially free from stickiness and drying the rubber mass so obtained.

TALIAFERRO J. FAIRLEY.
ROBERT FRYE.